US012739257B2

(12) United States Patent
Ražinskas et al.

(10) Patent No.: US 12,739,257 B2
(45) Date of Patent: Sep. 15, 2026

(54) DETECTING MALICIOUS BEHAVIOR FROM HANDSHAKE PROTOCOLS USING MACHINE LEARNING

(71) Applicant: UAB 360 IT, Vilnius (LT)

(72) Inventors: Dainius Ražinskas, Vilnius (LT); Mantas Briliauskas, Vilnius (LT)

(73) Assignee: UAB 360 IT, Vilnius (LT)

( * ) Notice: Subject to any disclaimer, the term of this patent is extended or adjusted under 35 U.S.C. 154(b) by 445 days.

(21) Appl. No.: 17/932,012

(22) Filed: Sep. 14, 2022

(65) Prior Publication Data

US 2024/0089270 A1 Mar. 14, 2024

Related U.S. Application Data

(63) Continuation of application No. 17/931,931, filed on Sep. 14, 2022.

(51) Int. Cl.

| | |
|---|---|
| ***H04L 9/40*** | (2022.01) |
| ***G06F 21/53*** | (2013.01) |
| ***G06F 21/56*** | (2013.01) |
| ***G06N 20/00*** | (2019.01) |

(52) U.S. Cl.

CPC .......... *H04L 63/1416* (2013.01); *G06F 21/53* (2013.01); *G06F 21/56* (2013.01); *G06N 20/00* (2019.01); *H04L 63/1408* (2013.01); *H04L 63/1425* (2013.01)

(58) Field of Classification Search

CPC . H04L 63/1416; H04L 63/1425; H04L 63/14; H04L 63/1408; G06N 20/00; G06F 21/53; G06F 21/56; G06F 21/566

See application file for complete search history.

(56) References Cited

U.S. PATENT DOCUMENTS

| | | | | |
|---|---|---|---|---|
| 10,243,977 | B1 * | 3/2019 | Govindarajan | H04L 63/1416 |
| 10,440,053 | B2 | 10/2019 | Wyatt | |
| 10,567,410 | B2 * | 2/2020 | Kuperman | G06F 21/55 |
| 11,140,196 | B1 | 10/2021 | Bilge | |
| 2008/0141376 | A1 | 6/2008 | Clausen | |
| 2019/0190961 | A1 * | 6/2019 | McGrew | G06F 21/554 |
| 2020/0204591 | A1 | 6/2020 | Yang | |

(Continued)

FOREIGN PATENT DOCUMENTS

| | | |
|---|---|---|
| CN | 113949531 A | 1/2022 |

OTHER PUBLICATIONS

Office Action issued for U.S. Appl. No. 17/931,931, dated Jan. 24, 2024.

(Continued)

*Primary Examiner* — William R Korzuch

(74) *Attorney, Agent, or Firm* — Meunier Carlin & Curfman LLC

(57) ABSTRACT

A method for identifying a malicious connection between a client device and a server includes obtaining handshake parameters for the client device and the server responsive to the client device initiating a connection with the server, generating a feature set by extracting features from the handshake parameters, predicting a maliciousness of the connection using a machine learning model, where the extracted features are provided as inputs to the machine learning model, and automatically initiating a corrective action if the connection is predicted to be malicious.

20 Claims, 7 Drawing Sheets

(56) References Cited

U.S. PATENT DOCUMENTS

| | | | | |
|---|---|---|---|---|
| 2022/0407722 | A1 | 12/2022 | Ucci | |
| 2023/0007024 | A1* | 1/2023 | Maria Vega | H04L 63/1441 |
| 2023/0007722 | A1 | 1/2023 | Vega | |
| 2023/0069731 | A1 | 3/2023 | Chen | |
| 2023/0134546 | A1* | 5/2023 | Gopalakrishnan | G06N 20/20<br>726/23 |
| 2023/0300144 | A1 | 9/2023 | Elgaafary | |

OTHER PUBLICATIONS

Office Action in connection to U.S. Appl. No. 17/931,931, dated Aug. 13, 2024.

Non-Final Office Action in connection to U.S. Appl. No. 17/932,008, dated Sep. 28, 2024.

Final Office Action in connection to U.S. Appl. No. 17/932,008, dated Apr. 16, 2025.

Non-Final Office Action in connection to U.S. Appl. No. 17/932,008, dated Sep. 18, 2025.

* cited by examiner

DETECTING MALICIOUS BEHAVIOR FROM HANDSHAKE PROTOCOLS USING MACHINE LEARNING

CROSS-REFERENCE TO RELATED APPLICATIONS

This application is a continuation of U.S. patent application Ser. No. 17/931,931, filed Sep. 14, 2022, which is incorporated herein by reference in its entirety.

BACKGROUND

With the growing interconnectedness of computing devices and systems in an increasingly digital age, new cyber security threats are constantly being identified. To detect threats, cyber security service providers (CSSPs) provide clients with cyber security (e.g., malware detection) software that monitors for malicious files, applications, and the like. In some cases, the cyber security software is trained using data on client devices themselves. However, existing cyber security software is often limited in the types of data, files, applications, etc., that can be monitored, creating potential weak points that can be exploited by malicious actors.

SUMMARY

One implementation of the present disclosure is a method for identifying a malicious connection between a client device and a server. The method includes obtaining handshake parameters for the client device and the server responsive to the client device initiating a connection with the server, generating a feature set by extracting features from the handshake parameters, predicting a maliciousness of the connection using a machine learning model, where the extracted features are provided as inputs to the machine learning model, and automatically initiating a corrective action if the connection is predicted to be malicious.

In some implementations, the machine learning model outputs a maliciousness score for the connection and the connection is predicted to be malicious if the maliciousness score meets or exceeds a threshold value.

In some implementations, the corrective action includes blocking or terminating the connection.

In some implementations, the corrective action includes suspending, deleting, or quarantining a software application of the client device that initiated the connection.

In some implementations, the corrective action includes generating an alert indicating to a user of the client device that the connection is predicted to be malicious.

In some implementations, the connection initiated by the client device is a Hypertext Transfer Protocol Secure (HTTPS) connection.

In some implementations, the handshake parameters include connection parameters associated with Secure Sockets Layer (SSL) protocol, Transport Layer Security (TLS) protocol, QUIC protocol, or Secure Shell (SSH) protocol.

In some implementations, the handshake parameters include a first set of parameters transmitted from the client device to the server in a client channel setup message and a second set of parameters transmitted from the server to the client device in a server channel setup message.

In some implementations, extracting features from the handshake parameters includes encoding non-numerical handshake parameters as numerical values.

In some implementations, extracting features from the handshake parameters includes generating a probability of maliciousness for any non-numerical handshake parameters by evaluating the non-numerical handshake parameters using a natural language processing (NLP) model.

In some implementations, the machine learning model is one of a neural network, a deep neural network, a Support Vector Machine (SVM), a nearest neighbor model, a Naïve-Bayes model, a decision tree, or a linear regression model.

Another implementation of the present disclosure is a malware detection system that includes one or more processors and memory having instructions stored thereon that, when executed by the one or more processors, cause the system to obtain handshake parameters for the client device and the server responsive to the client device initiating a connection with the server, generate a feature set by extracting features from the handshake parameters, predict a maliciousness of the connection using a machine learning model, where the extracted features are provided as inputs to the machine learning model, and automatically initiate a corrective action if the connection is predicted to be malicious.

In some implementations, the machine learning model outputs a maliciousness score for the connection, and where the connection is predicted to be malicious if the maliciousness score meets or exceeds a threshold value.

In some implementations, the corrective action includes blocking or terminating the connection.

In some implementations, the corrective action includes suspending, deleting, or quarantining a software application of the client device that initiated the connection.

In some implementations, the corrective action includes generating an alert indicating to a user of the client device that the connection is predicted to be malicious.

In some implementations, the connection initiated by the client device is a Hypertext Transfer Protocol Secure (HTTPS) connection.

In some implementations, the handshake parameters include connection parameters associated with Secure Sockets Layer (SSL) protocol, Transport Layer Security (TLS) protocol, QUIC protocol, or Secure Shell (SSH) protocol.

In some implementations, the handshake parameters include a first set of parameters transmitted from the client device to the server in a client channel setup message and a second set of parameters transmitted from the server to the client device in a server channel setup message.

In some implementations, extracting features from the handshake parameters includes encoding non-numerical handshake parameters as numerical values.

In some implementations, extracting features from the handshake parameters includes generating a probability of maliciousness for any non-numerical handshake parameters by evaluating the non-numerical handshake parameters using a natural language processing (NLP) model.

In some implementations, the machine learning model is one of a neural network, a deep neural network, a Support Vector Machine (SVM), a nearest neighbor model, a Naïve-Bayes model, a decision tree, or a linear regression model.

Yet another implementation of the present disclosure is a computer readable medium having instructions stored thereon that, when executed by one or more processors, cause the one or more processors to perform operations including obtaining handshake parameters for the client device and the server responsive to the client device initiating a connection with the server, generating a feature set by extracting features from the handshake parameters, predicting a maliciousness of the connection using a machine learning model, where the extracted features are provided as inputs to the machine learning model, and automatically initiating a corrective action if the connection is predicted to be malicious.

In some implementations, the machine learning model outputs a maliciousness score for the connection, and where the connection is predicted to be malicious if the maliciousness score meets or exceeds a threshold value.

In some implementations, the corrective action includes blocking or terminating the connection.

In some implementations, the corrective action includes suspending, deleting, or quarantining a software application of the client device that initiated the connection.

In some implementations, the corrective action includes generating an alert indicating to a user of the client device that the connection is predicted to be malicious.

In some implementations, the connection initiated by the client device is a Hypertext Transfer Protocol Secure (HTTPS) connection.

In some implementations, the handshake parameters include connection parameters associated with Secure Sockets Layer (SSL) protocol, Transport Layer Security (TLS) protocol, QUIC protocol, or Secure Shell (SSH) protocol.

In some implementations, the handshake parameters include a first set of parameters transmitted from the client device to the server in a client channel setup message and a second set of parameters transmitted from the server to the client device in a server channel setup message.

In some implementations, extracting features from the handshake parameters includes encoding non-numerical handshake parameters as numerical values.

In some implementations, extracting features from the handshake parameters includes generating a probability of maliciousness for any non-numerical handshake parameters by evaluating the non-numerical handshake parameters using a natural language processing (NLP) model.

In some implementations, the machine learning model is one of a neural network, a deep neural network, a Support Vector Machine (SVM), a nearest neighbor model, a Naïve-Bayes model, a decision tree, or a linear regression model.

Yet another implementation of the present disclosure is a method of generating a machine learning model for detecting malicious connections between two or more computing devices. The method includes executing, within a secure operating environment, a plurality of known malicious software applications and a plurality of known non-malicious software applications,

- generating a dataset of known handshake parameters by monitoring connections between i) the plurality of known malicious software applications and one or more target servers, and ii) the plurality of known non-malicious software applications and the one or more target servers,
- training a machine learning model using the dataset of known handshake parameters, where the machine learning model is configured to predict a maliciousness of a connection between two or more computing devices based on handshake parameters between the two or more computing devices, and distributing the machine learning model to one or more client devices.

In some implementations, the connections between the plurality of known malicious software applications and one or more target servers or the plurality of known non-malicious software applications and the one or more target servers are Hypertext Transfer Protocol Secure (HTTPS) connections.

In some implementations, the handshake parameters include connection parameters associated with Secure Sockets Layer (SSL) protocol, Transport Layer Security (TLS) protocol, QUIC protocol, or Secure Shell (SSH) protocol.

In some implementations, for each connection between the plurality of known malicious software applications and one or more target servers or the plurality of known non-malicious software applications and the one or more target servers, a set of handshake parameters is collected, the set of handshake parameters including a first subset of parameters transmitted from a known malicious software application or a known non-malicious software application to the one or more target servers in a client channel setup message and a second subset of parameters transmitted from the target server to the known malicious software application or the known non-malicious software application in a server channel setup message.

In some implementations, generating the dataset of known handshake parameters further includes extracting features from each set of handshake parameters by at least one of encoding non-numerical parameters as numerical values or generating a probability of maliciousness for any non-numerical parameters by evaluating the non-numerical parameters using a natural language processing (NLP) model.

In some implementations, the method further includes distributing the dataset of handshake parameters to each of the one or more client devices.

In some implementations, the machine learning model is distributed to the one or more client devices as part of a client application software package.

In some implementations, the machine learning model is one of a neural network, a deep neural network, a Support Vector Machine (SVM), a nearest neighbor model, a Naïve-B ayes model, a decision tree, or a linear regression model.

Yet another implementation of the present disclosure a malware detection system that includes one or more processors and memory having instructions stored thereon that, when executed by the one or more processors, cause the system to execute, within a secure operating environment, a plurality of known malicious software applications and a plurality of known non-malicious software applications, generate a dataset of known handshake parameters by monitoring connections between i) the plurality of known malicious software applications and one or more target servers, and ii) the plurality of known non-malicious software applications and the one or more target servers, train a machine learning model using the dataset of known handshake parameters, where the machine learning model is configured to predict a maliciousness of a connection between two or more computing devices based on handshake parameters between the two or more computing devices, and distribute the machine learning model to one or more client devices.

In some implementations, the connections between the plurality of known malicious software applications and one or more target servers or the plurality of known non-malicious software applications and the one or more target servers are Hypertext Transfer Protocol Secure (HTTPS) connections.

In some implementations, the handshake parameters include connection parameters associated with Secure Sockets Layer (SSL) protocol, Transport Layer Security (TLS) protocol, QUIC protocol, or Secure Shell (SSH) protocol.

In some implementations, for each connection between the plurality of known malicious software applications and one or more target servers or the plurality of known non-malicious software applications and the one or more target servers, a set of handshake parameters is collected, the set of handshake parameters including a first subset of parameters transmitted from a known malicious software application or a known non-malicious software application to the one or more target servers in a client channel setup message and a second subset of parameters transmitted from the target server to the known malicious software application or the known non-malicious software application in a server channel setup message.

In some implementations, generating the dataset of known handshake parameters further includes extracting features from each set of handshake parameters by at least one of:

- encoding non-numerical parameters as numerical values, or
- generating a probability of maliciousness for any non-numerical parameters by evaluating the non-numerical parameters using a natural language processing (NLP) model.

In some implementations, the instructions further cause the system to distribute the dataset of handshake parameters to each of the one or more client devices.

In some implementations, the machine learning model is distributed to the one or more client devices as part of a client application software package.

In some implementations, the machine learning model is one of a neural network, a deep neural network, a Support Vector Machine (SVM), a nearest neighbor model, a Naïve-Bayes model, a decision tree, or a linear regression model.

Yet another implementation of the present disclosure is a computer readable medium having instructions stored thereon that, when executed by one or more processors, cause the one or more processors to perform operations including executing a plurality of known malicious software applications and a plurality of known non-malicious software applications, generating a dataset of known handshake parameters by monitoring connections between i) the plurality of known malicious software applications and one or more target servers, and ii) the plurality of known non-malicious software applications and the one or more target servers, training a machine learning model using the dataset of known handshake parameters, where the machine learning model is configured to predict a maliciousness of a connection between two or more computing devices based on handshake parameters between the two or more computing devices, and distributing the machine learning model to one or more client devices.

In some implementations, the connections between the plurality of known malicious software applications and one or more target servers or the plurality of known non-malicious software applications and the one or more target servers are Hypertext Transfer Protocol Secure (HTTPS) connections.

In some implementations, the handshake parameters include connection parameters associated with Secure Sockets Layer (SSL) protocol, Transport Layer Security (TLS) protocol, QUIC protocol, or Secure Shell (SSH) protocol.

In some implementations, for each connection between the plurality of known malicious software applications and one or more target servers or the plurality of known non-malicious software applications and the one or more target servers, a set of handshake parameters is collected, the set of handshake parameters including a first subset of parameters transmitted from a known malicious software application or a known non-malicious software application to the one or more target servers in a client channel setup message and a second subset of parameters transmitted from the target server to the known malicious software application or the known non-malicious software application in a server channel setup message.

In some implementations, generating the dataset of known handshake parameters further includes extracting features from each set of handshake parameters by at least one of encoding non-numerical parameters as numerical values or generating a probability of maliciousness for any non-numerical parameters by evaluating the non-numerical parameters using a natural language processing (NLP) model.

In some implementations, the operations further include distributing the dataset of handshake parameters to each of the one or more client devices.

In some implementations, the machine learning model is distributed to the one or more client devices as part of a client application software package.

In some implementations, the machine learning model is one of a neural network, a deep neural network, a Support Vector Machine (SVM), a nearest neighbor model, a Naïve-Bayes model, a decision tree, or a linear regression model.

Yet another implementation of the present disclosure is a method for identifying malicious connections between computing devices. The method includes generating a dataset including a first set of handshake parameters for a first set of connections between a first set of software applications and a first set of target devices, where the first set of software applications include one or more known malicious software applications and one or more known non-malicious software applications, training a machine learning model using the dataset, where the machine learning model is configured to predict a maliciousness of a connection between a first computing device and a target device based on handshake parameters for the connection, obtaining a second set of handshake parameters responsive to a software application executing on the first computing device initiating the connection with the target device, generating a feature set by extracting features from the second set of handshake parameters, predicting a maliciousness of the connection using the trained machine learning model, where the extracted features are provided as inputs to the trained machine learning model, and automatically initiating a corrective action if the connection is predicted to be malicious.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Referring generally to the figures, a system and methods for detecting malicious online behavior are shown. More specifically, the system described herein monitors connection parameters, also referred to herein as "handshake parameters," for external connections initiated by software applications on a client device in order to predict a probability that the connection(s) are malicious. For example, a malicious application executing on a client device (e.g., a user's computer) can initiate a connection with a target server and communicate private user data without consent. Accordingly, the system and methods described herein provide a malware detection solution that can protect user data from being communicated to external devices by detecting potentially malicious connection requests and automatically initiating responsive actions (e.g., terminating or blocking the connection, quarantining the application, etc.). Additionally, the system and methods described herein may detect man-in-the-middle (MITM) attacks and/or other types of cyberattacks that intercept and/or modify data being transmitted between two or more devices. Additional features and advantages of the system and methods described herein are discussed in detail below.

Overview

Figure 1:
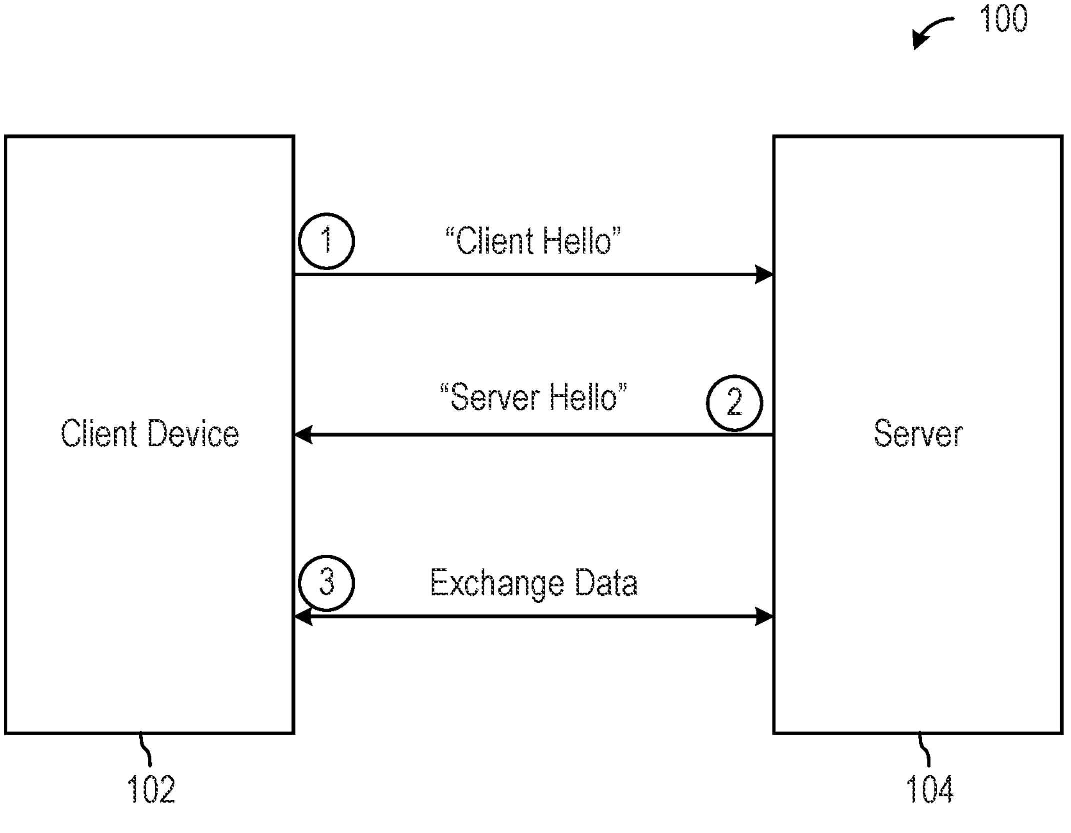
FIG. 1 is a block diagram of an example handshake between an example client device and an example server, according to some embodiments.

Turning first to FIG. 1, a block diagram of an example handshake 100 a between an example client device 102 and an example server 104 is shown, according to some embodiments. At a high level, handshake 100 represents the process of a first computing device (e.g., client device 102) establishing a connection with a second computing device (e.g., server 104) using any suitable connection protocol. In some embodiments, handshake 100 represents a handshake using Secure Sockets Layer (SSL) or Transport Layer Security (TLS) protocols. As known to those in the art, SSL and TLS are cryptographic protocols for communications over a computer network. SSL and, more recently, TLS, are commonly used encryptions in Hypertext Transfer Protocol Secure (HTTPS). Accordingly, a "connection," as described herein, may refer to an HTTPS connection between a first device (e.g., a client computing device) and a second device (e.g., a server). For example, software applications on a client device may initiate connections with external devices (e.g., servers) via an Internet connection that is secured using HTTPS. It should be appreciated that SSL and TLS are not the only connection protocols contemplated herein, however. In some implementations, handshake 100 represents the establishment of a connection using the QUIC network protocol. In some implementations, handshake 100 represents the establishment of a connection using the Secure Shell Protocol (SSH).

At a high level, FIG. 1 illustrates the flow (i.e., transfer) of data between client device 102 and server 104 during handshake 100. As described in greater detail below, client device 102 and server 104 may send and receive data (i.e., communicate) via any suitable communication channels, such as via a direct connection or via a network (e.g., a VPN, the Internet, etc.). Client device 102 is generally a computing device (e.g., a workstation, a server, a desktop or laptop computer, a smartphone, etc.) and/or a group of computing devices that initiates a connection, as described herein. Specifically, in some embodiments, client device 102 executes at least one software application that initiates a connection with an external device (e.g., a remote server). For example, client device 102 may be a computer owned and/or operated by a client (i.e., customer) of a cyber security service provider (CSSP). In some implementations, client device 102 may be a server.

Server 104 generally represents any computing device (e.g., a remote server) that is external to client device 102 and that can exchange data with client device 102 over a network or other data connection. Server 104 may, accordingly, be considered a "target device" as it is the target of a connection request or transmission initiated by client device 102. In some embodiments, client device 102 is remote from server 104. For example, client device 102 may be physically located at a property associated with the client of the CSSP, while server 104 may be located anywhere across the globe. It should be appreciated that, while FIG. 1 illustrates an implementation where client device 102 is a client computing device, in some implementations, client device 102 may additionally or alternatively be a server. Accordingly, handshake 100 may be similarly representative of a handshake between two servers.

In some embodiments, connections are initiated by applications that are executed on client device 102. An application, as discussed herein, generally refers to a software application that executes on a first computing device, such as client device 102. Example applications include word processing programs, image or video editing software, data management software, web browsers, and the like. Often, these and other types of applications may attempt to connect to remote devices (e.g., a remote server) to retrieve or send data, for remote processing, etc. For example, a web browser may initiate a connection with a remote server in order to access a specific website or to send data from a form filled out on the client device 102.

To initiate handshake 100, client device 102 is shown to first send a client channel setup message (1) that contains one or more connection parameters (i.e., cryptographic information) associated with client device 102. In the context of TLS/SSL handshakes, for example, the client channel setup message is also called a "client hello," as it will be referred to herein. For simplicity's sake, "client hello" is also used herein to refer to the initiation and initial connection parameters transmitted by client device 102 using any other protocol, such as QUIC or SSH. The "client hello" message generally includes various client-side connections parameters such as a version of the protocol (e.g., TLS/SSL, SSH, etc.), a list of cypher suites supported by client device 102, a list of elliptic curves supported by client device 102, a server identification name (SNI) or hostname (i.e., the hostname that client device 102 is attempting to connect to), the data compression methods supported by client device 102, a Diffie-Hellman (DH) parameter (if present), and a random byte string (optional) to be used in subsequent computations. While illustrated as a single message for simplicity, it is contemplated that the client channel setup message may comprise a plurality of messages or data packets for communicating the connection parameters supported by the client device 102.

Server 104 may respond with a server channel setup message (2) or a "server hello." For simplicity's sake, "server hello" is also used herein to refer to connection parameters transmitted by server 104 or another target device using any protocol, including SSL, TLS, QUIC, SSH, and the like. Similar to the "client hello" message, the "server hello" message generally includes one or more connection parameters (i.e., cryptographic information) associated with server 104. Such connection parameters can include a list of cypher suites supported by server 104, a selected cypher suite, a domain name of the target, an issuer of the server's certificate, an algorithm, an exponent, a list of client certificate types, a second DH parameter (if present), the digital certificate for server 104, and a request for the digital certificate of client device 102 (optional). It should be appreciated that the lists of connection parameters sent by each of client device 102 and server 104 provided herein are not intended to be limiting and that other connection parameters may be used in various implementations.

While illustrated as a single message for simplicity, it is contemplated that the server channel setup message may comprise a plurality of messages or data packets for communicating the connection parameters supported by the server 104. Additionally, while only a single exchange of information is illustrated between the client device 102 and server 104, it is contemplated that multiple exchanges of information, data packets, or messages may be communicated back and forth between the client device 102 and server 104 to establish a secure communication channel. Further, in some embodiments, the "client hello" and "server hello" messages, also referred to herein as the client channel setup message and server channel setup message, respectively, are transmitted in plaintext in order to establish a secure connection (e.g., an HTTPS connection).

In some embodiments, client device 102 may verify the digital certificate for server 104 (e.g., received with the "server hello") and/or may check the connection parameters received from server 104. In some embodiments, client device 102 transmits a second random byte string to server 104 after receiving and verifying the connection parameters for server 104. In some such embodiments, client device 102 may generate the second random byte string using a public key received from server 104. Thus, the second random byte string allows both client device 102 and server 104 to compute a secret key for subsequent messaging. In some embodiments, if server 104 sends a client certificate request, client device 102 also sends a copy of its digital certificate. In some such embodiments, server 104 then validates the digital certificate of client device 102. In some embodiments, to end the handshake, client device 102 may transmit a "finished" message indicating that the client portion of handshake 100 is complete. Additionally, server 104 may transmit a "finished" message indicating that the server portion of handshake 100 is complete. In some embodiments, the "finished" messages may be encrypted with a secret key generated by client device 102.

Once handshake 100 is completed, client device 102 and server 104 may begin to exchange data and messages (3) over a cryptographically secured communication channel. In some embodiments, communications are symmetrically encrypted using the shared secret key. Thus, while the data exchanged between client device 102 and server 104, vulnerabilities still exist in the handshake process (e.g., handshake 100). In particular, malicious applications (e.g., software applications) executing on client device 102 may initiate connections with fake or malicious servers and can communicate private user data. In some cases, this may indicate that one or both of the application on the client device 102 or the target server (e.g., server 104) are malicious. Advantageously, the system and methods described herein leverage existing handshake parameters (e.g., from "client hello" and "server hello" messages) used in existing connection protocols (e.g., TLS/SSL, QUIC, SSH, etc.) to determine whether a connection (e.g., initiated by an application on client device 102) is malicious, such that the connection may be terminated, the application quarantined, the target server blacklisted, etc., as described in greater detail below.

Figure 2:
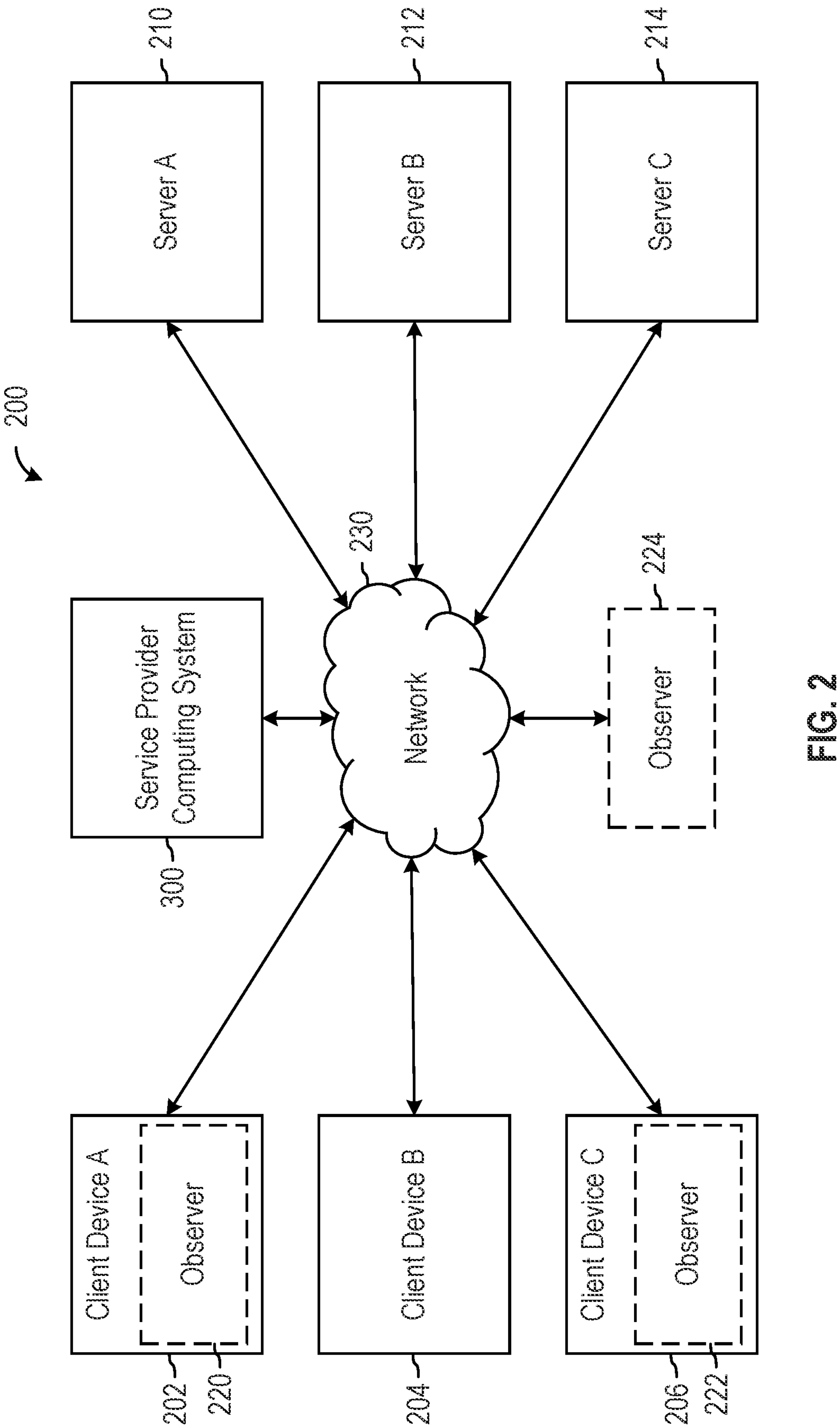
FIG. 2 is a block diagram of a communication architecture between a plurality of client devices and a plurality of servers, according to some embodiments.

Referring now to FIG. 2, a block diagram of a communication architecture 200 involving a plurality of client devices 202-206 and a plurality of servers 210-214 is shown, according to some embodiments. In general, client devices 202-206 represent any computing device that can communicate with one or more external devices (e.g., servers 210-214). As described herein, a computing device executing a software application that initiates a connection with an external device is denoted as a "client" device. In some embodiments, client devices 202-206 are the same as, or functionally equivalent to, client device 102, described above. For example, each of client devices 202-206 may include at least one processor and memory having instructions stored thereon that can be executed by the at least one processor to cause the corresponding one of client devices 202-206 to perform various operations, including those described herein.

Similarly, servers 210-214 generally represent any computing device that can communicate with one or more client devices. As described herein, any computing device (e.g., servers 210-214) that is the target or destination of a connection initiated by a client device (e.g., one of client devices 202-206) is denoted as a "target" device. Accordingly, servers 210-214 may be considered "target devices" or "target servers." In some embodiments, server 210-214 are the same as, or functionally equivalent to, server 104, described above. For example, each of server 210-214 may include at least one processor and memory having instructions stored thereon that can be executed by the at least one processor to cause the corresponding one of server 210-214 to perform various operations, including those described herein. Server 210-214 are generally the targets of connection requests initiated by client devices 202-206. Each of client devices 202-206 are shown to communicate with servers 210-210 via a network 230, which may be any suitable communications network. For example, network 230 may be a wide area network (WAN) (e.g., the Internet), a virtual private network (VPN), a local area network (LAN), etc. For simplicity, network 230 is generally described herein as the Internet.

Shown throughout communication architecture 200 are observers 220-224, which are configured to monitor connection requests and/or communications between client devices 202-206 and servers 210-214. As described in greater detail below with respect to FIG. 4, observers 220-224 may be stand-alone computing devices or may be components of other computing devices. More generally, it should be appreciated that observers 220-224 may be implemented at any point in communication architecture 200. For example, observers 220-224 may be components of client devices 202-206, servers 210-214, or any other computing device that is communicably coupled to network 230. In FIG. 2, for example, observers 220 and 222 are components of client devices 202 and 222, respectively, while observer 224 is separate from any of client devices 202-206 or servers 210-214. In this example, observer 224 may be a component of another computing device (e.g., a server), which is not shown.

Observers 220-224 are generally configured to monitor connection parameters for a connection request initiated by a corresponding one of client devices 202-206. With respect to handshake 100 of FIG. 1, for example, observers 220-224 may collect or otherwise identify handshake parameters (i.e., connection parameters) transmitted by both client devices 202-206 (e.g., in a "client hello" message) and servers 210-214 (e.g., in a "server hello" message) responsive to one or client devices 202-206 initiating a connection. As mentioned above, handshake parameters (e.g., the client and server channel setup messages or "client hello" and "server hello") may be communicated in plain text prior to establishing a secured communication channel (e.g., an HTTPS connection). Put another way, client devices 202-206 may transmit their "client hello" messages in plain text and servers 210-214 may respond with a "server hello" message in plain text in order to establish a secure cryptographic channel. In this manner, observers 220-224 can obtain (e.g., record, collect, receive, or intercept) and analyze handshake parameters that are communicated in plain text between one of client devices 202-206 and one of servers 210-214 (e.g., a target server).

Observers 220-224 may evaluate the obtained handshake parameters to either detect or predict malicious activity (e.g., malicious connections). If a connection cannot be readily identified as malicious or not malicious (i.e., clean), then observers 220-224 may use a malware detection model to predict a maliciousness of the connection using the handshake parameters. If a malicious connection is detected or if it is predicted that the connection is malicious, observers 220-224 may initiate corresponding corrective actions including, but not limited to, blocking or terminating the connection, quarantining or deleting an application that initiated the connection, blocking or blacklisting the target server for the connection, and/or alerting a user to the potentially malicious connection.

In some implementations, observers 220-224 are also used to detect man-in-the-middle (MITM) attacks. MITM attacks are known in the art as cyberattacks where an attacker (e.g., a computing device) intercepts and/or modifies communications between a first device (e.g., one of client devices 202-206) and a target device (e.g., one of servers 210-214). In MITM, the first device and the target device may assume that they are communicating directly, without knowledge of the MITM device. Accordingly, observers 220-224 may evaluate handshake parameters for connections between the first device and target devices to detect MITM attacks. For example, observers 220-224 may track certificate issuers, certificate expiration dates, certificate types, and also identify, based on this data, if data traffic is being rerouted. Additionally features of observers 220-224 are described in greater detail below with respect to FIG. 4.

Communication architecture 200 is further shown to include a service provider computing system 300, which is generally a computing system (i.e., a device or group of devices) operated by a CSSP. For example, system 300 may be a sever operated by a CSSP. In general, system 300 may be configured to generate and/or train malware detection models that are distributed to observers 220-224. As mentioned above, the malware detection model(s) generated, trained, and/or distributed by system 300 are generally configured to predict a maliciousness of a connection (e.g., an HTTPS connection) based on the handshake parameters. In some embodiments, the malware detection model(s) are distributed to observers 220-224 as part of a client application software package, such as a security software package. In some embodiments, system 300 also maintains a database of known malicious and clean targets (e.g., servers 210-214). Additionally features of system 300 described in greater detail below with respect to FIG. 3.

CSSP Computing System

Figure 3:
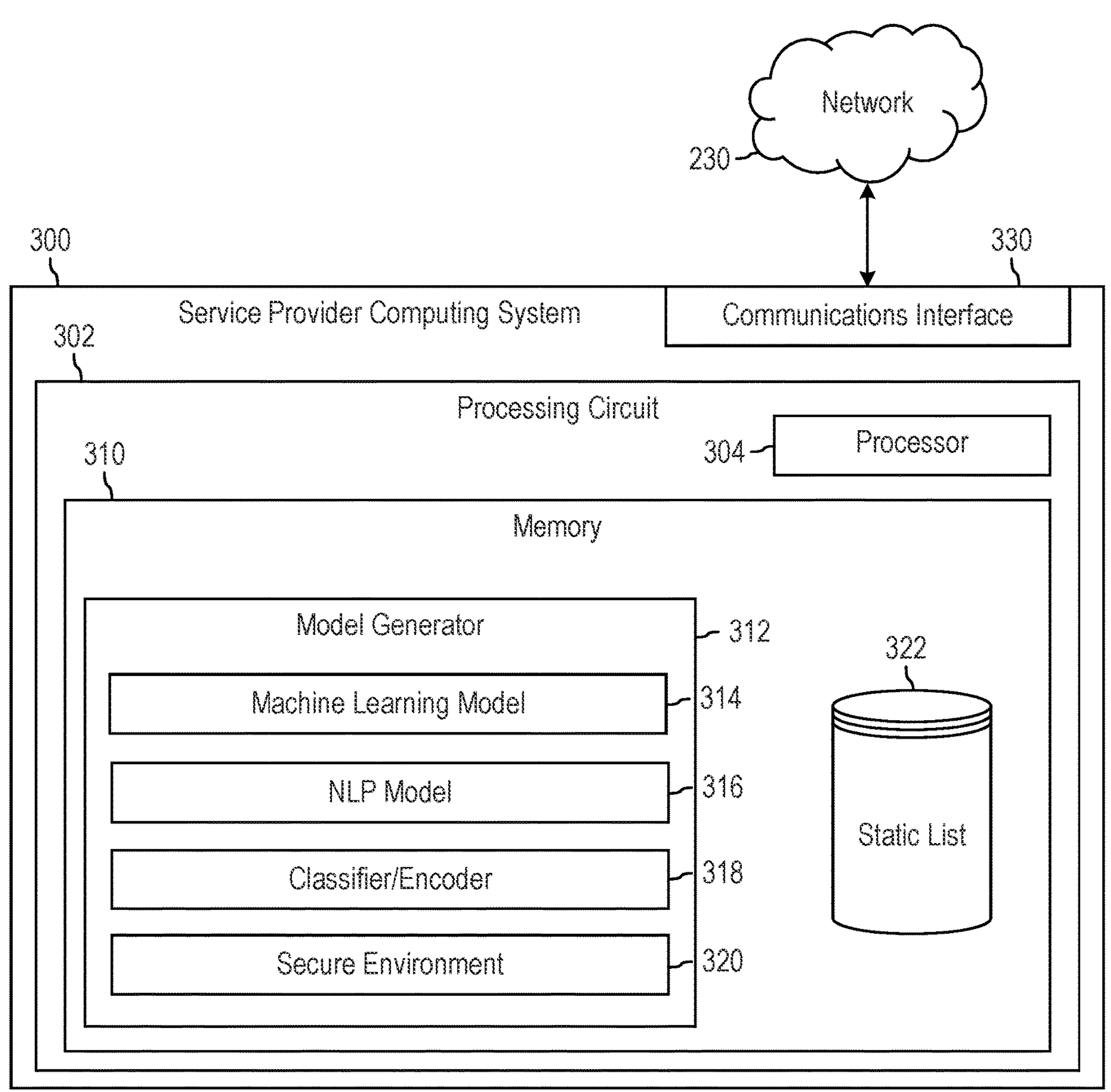
FIG. 3 is a detailed block diagram of the service provider computing system of FIG. 2, according to some embodiments.

Referring now to FIG. 3, a detailed block diagram of service provider computing system 300 is shown, according to some embodiments. As mentioned above, system 300 generally includes or is a computing device (e.g., a workstation, a server, etc.) or a group of computing devices that are operated by a CSSP. For example, system 300 can be a server (e.g., a cloud server) operated by the CSSP and/or that hosts software and/or other services offered by the CSSP. System 300 is shown to include a processing circuit 302 that includes a processor 304 and a memory 310. Processor 304 can be a general-purpose processor, an application specific integrated circuit (ASIC), one or more field programmable gate arrays (FPGAs), a group of processing components, or other suitable electronic processing structures. In some embodiments, processor 304 is configured to execute program code stored on memory 310 to cause system 300 to perform one or more operations, as described below in greater detail.

Memory 310 can include one or more devices (e.g., memory units, memory devices, storage devices, etc.) for storing data and/or computer code for completing and/or facilitating the various processes described in the present disclosure. In some embodiments, memory 310 includes tangible (e.g., non-transitory), computer-readable media that stores code or instructions executable by processor 304. Tangible, computer-readable media refers to any physical media that is capable of providing data that causes system 300 to operate in a particular fashion. Example tangible, computer-readable media may include, but is not limited to, volatile media, non-volatile media, removable media and non-removable media implemented in any method or technology for storage of information such as computer readable instructions, data structures, program modules or other data. Accordingly, memory 310 can include random access memory (RAM), read-only memory (ROM), hard drive storage, temporary storage, non-volatile memory, flash memory, optical memory, or any other suitable memory for storing software objects and/or computer instructions. Memory 310 can include database components, object code components, script components, or any other type of information structure for supporting the various activities and information structures described in the present disclosure. Memory 310 can be communicably connected to processor 304, such as via processing circuit 302, and can include computer code for executing (e.g., by processor 304) one or more processes described herein.

While shown as individual components, it will be appreciated that processor 304 and/or memory 310 can be implemented using a variety of different types and quantities of processors and memory. For example, processor 304 may represent a single processing device or multiple processing devices. Similarly, memory 310 may represent a single memory device or multiple memory devices. Additionally, in some embodiments, system 300 may be implemented within a single computing device (e.g., one server, one housing, etc.). In other embodiments, system 300 may be distributed across multiple servers or computers (e.g., that can exist in distributed locations). For example, system 300 may include multiple distributed computing devices (e.g., multiple processors and/or memory devices) in communication with each other that collaborate to perform operations. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. For example, virtualization software may be employed by system 300 to provide the functionality of a number of servers that is not directly bound to the number of computers in system 300.

Memory 310 is shown to include a model generator 312 that generates and trains a machine learning model 314 for predicting the maliciousness of a connection between two or more computing devices. Specifically, machine learning model 314 may use handshake (i.e., connection) parameters between a client device (e.g., one of client devices 202-206) and a target device (e.g., a server, such as one of servers 210-214) to predict whether the connection is malicious. In this regard, the inputs provided to machine learning model 314 may be handshake parameters, and machine learning model 314 may output a prediction of maliciousness. In some embodiments, the prediction is a classification, such as "malicious" or "not malicious." In some such embodiments, the classification is binary (e.g., a '0' or '1'). Accordingly, machine learning model 314 is generally any suitable classification model. For example, machine learning model 314 may be one of a neural network, a deep neural network, a Support Vector Machine (SVM), a nearest neighbor model, a Naïve-Bayes model, a decision tree, a linear regression model, or the like.

In some embodiments, machine learning model 314 outputs a value indicating a likelihood of maliciousness. For example, machine learning model 314 may output a value between 0 and 1, where '0' is "not malicious" or "clean," and '1' is "malicious." In some such embodiments, a connection may only be identified as "malicious" or "clean" if the value provided by machine learning model 314 is above or below a threshold. For example, model generator 312 may determine whether the output of machine learning model 314 is above 0.6, indicating malicious, or below 0.4, indicating not malicious. It will be appreciated that any number of thresholds may be set. In the example above, only one threshold is set (e.g., a value of 0.6 or above is malicious). However, in other examples, multiple thresholds may be set. For example, in some embodiments, any output that falls between an upper and a lower threshold (e.g., two threshold values) may be classified as "unknown," in which case the handshake parameters for the associated connection request may be stored for further evaluation.

In some embodiments, machine learning model 314 outputs a confidence score for the prediction. A confidence score generally indicates a likelihood that the prediction is correct. For example, if machine learning model 314 predicts that a connection is malicious with a 95% confidence score, then it is highly likely that the prediction is correct, whereas a confidence score of 40% would indicate that the prediction may not be accurate. Similarly, a confidence score of 85% for a prediction of "clean" would indicate that the connection is very likely to be clean (i.e., non-malicious). In some embodiments, model generator 312 may determine that a connection is malicious or clean only if the confidence score is above a threshold, such as 50% or 0.5.

Once generated, model generator 312 may train machine learning model 314 using handshake parameters for a plurality of known clean and known malicious applications and/or target devices (e.g., servers). Model generator 312 may train machine learning model 314 using any suitable supervised training method. For example, handshake parameters for one or more known clean applications and/or target devices may be provided to machine learning model 314 and the outputs of machine learning model 314 compared to the ground truth data for the corresponding applications and/or target devices (e.g., whether the applications and/or target devices are malicious or not). The weights of machine learning model 314 may then be incrementally adjusted to minimize the error in the output when compared to the known value (e.g., malicious or clean). In some embodiments, the trained machine learning model 314 may be distributed to one or more client devices, such as observers 220-224, such that observer 220-224 can use the trained model to detect and address malicious activity. In some embodiments, the malware detection model(s) are distributed to client device(s) as part of a client application software package, such as a security software package.

In some embodiments, handshake parameters are stored in a static list 322. More generally, static list 322 is a database of known malicious and clean applications and target servers, and their corresponding handshake (i.e., connection) parameters. For example, both the "client hello" and "server hello" parameters may be stored in static list 322 for a known clean application that connects to a remote device. Additionally, or alternatively, static list 322 may simply indicate whether various applications and target servers are known to be malicious or clean. In some embodiments, model generator 312 may generate or update static list 322 by executing known clean and malicious applications in a secure environment 320; although, it will be appreciated that static list 322 may also be user defined. Secure environment 320 may be a digital sandbox, where clean and malicious applications can be executed without infecting a computer system or device with malware. For example, secure environment 320 may be portioned from the other components of memory 310. In some such embodiments, model generator 312 can record the handshake parameters transmitted by the application and received from the target device (e.g., a remote server), which are then added to static list 322. The generation of a static list, such as static list 322, is also described in U.S. patent application Ser. No. 17/698,028, filed Mar. 18, 2022, which is incorporated herein by reference in its entirety. In some embodiments, particularly when static list 322 is generated by model generator 312 or otherwise maintained by system 300, static list 322 is reviewed by an expert user in order reduce possibility of false positives or false negatives in malware predictions.

In some cases, these stored handshake parameters are not in a suitable form to train machine learning model 314. For example, machine learning model 314 may require only numerical values as inputs, whereas some handshake parameters (e.g., the target domain name) are alphabetic or alphanumeric. In some such embodiments, model generator 312 further includes a natural language processing (NLP) model 316 that processes non-numeric handshake parameters and predicts a maliciousness of the parameter itself. In some embodiments, the predicted maliciousness is provided as an input to machine learning model 314. For example, NLP model 316 may predict a maliciousness of a connection by evaluating the target domain name (e.g., a domain name with spelling errors, out-of-place characters, etc., may be malicious). In this example, if NLP model 316 predicts that an alphabetical parameter is malicious, it may output a binary value (e.g., '0' or '1'), a confidence score, and/or a maliciousness score (e.g., from 0 to 1).

In some embodiments, model generator 312 further includes a classifier/encoder 318 for converting additional handshake parameters into numerical values and/or for normalizing certain numerical parameters. In some embodiments, classifier/encoder 318 maps non-numerical or alphanumeric values to numerical values. For example, classifier/encoder 318 may map available/selected cypher suites to numerical values (e.g., suite A becomes '1', suite B becomes '2', etc.). In some embodiments, classifier/encoder 318 includes a table of values that defines said mapping. In some embodiments, classifier/encoder 318 represents an embedding layer of machine learning model 314 which converts words (e.g., an input) to fixed length vectors. For example, a word "A" can be converted to '1', a word "B" can be converted to '2', and so on. Each value can then be assigned a vector value, which may be a randomized value. During training of machine learning model 314, these vector values may be adjusted. In this manner, each word or input is assigned a meaningful representation in a vector space. In some embodiments, classifier/encoder 318 normalizes some numerical values to, for example, a value between 0 and 1. Thus, classifier/encoder 318 can help to prevent preexisting numerical values in the handshake parameters from disproportionately affecting the maliciousness prediction from machine learning model 314. In some embodiments, once machine learning model 314 is trained, model generator 312 transmits the trained model to one or more devices, such as observers 220-224. Additionally, in some embodiments, system 300 may transmit a copy of static list 322 to each of observers 220-224.

Still referring to FIG. 3, system 300 is also shown to include a communications interface 330. Communications interface 330 may facilitate communications between system 300 and any external components or devices, including client devices 202-206. For example, communications interface 330 can provide means for transmitting data to, or receiving data from, client devices 202-206. Accordingly, communications interface 330 can be or can include a wired or wireless communications interface (e.g., jacks, antennas, transmitters, receivers, transceivers, wire terminals, etc.) for conducting data communications, or a combination of wired and wireless communication interfaces. In some embodiments, communications via communications interface 330 are direct (e.g., local wired or wireless communications) or via a network (e.g., a WAN, the Internet, a cellular network, etc.). For example, communications interface 330 may include one or more Ethernet ports for communicably coupling system 300 to a network (e.g., the Internet). In another example, communications interface 330 can include a WiFi transceiver for communicating via a wireless communications network. In yet another example, communications interface 330 may include cellular or mobile phone communications transceivers.

Observers

Figure 4:
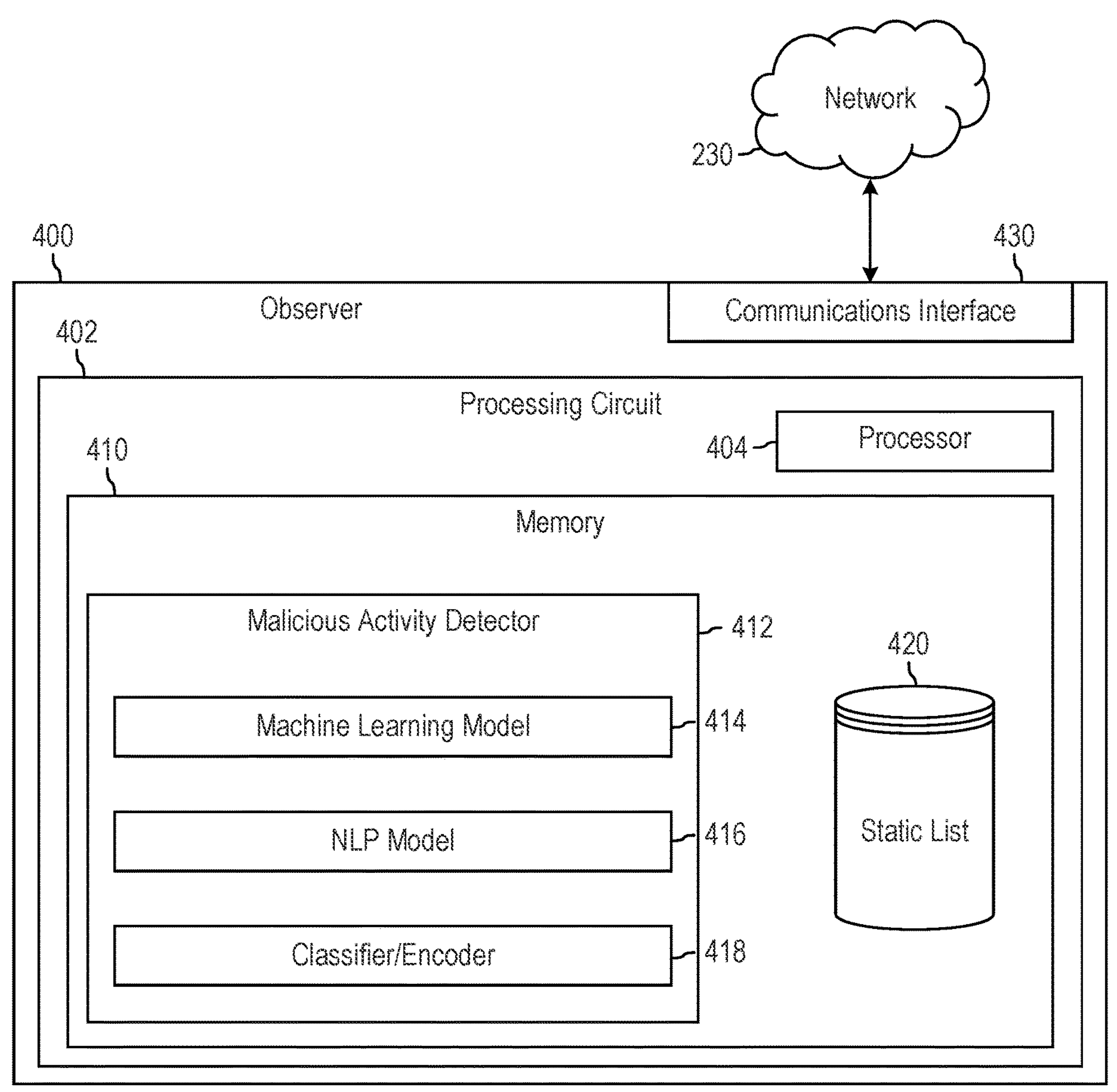
FIG. 4 is a detailed block diagram of the observer of FIG. 2, according to some embodiments.

Referring now to FIG. 4, a detailed block diagram of an observer 400 is shown, according to some embodiments. Observer 400 is generally representative of one of observers 220-224. As mentioned above with respect to observers 220-224, for example, observer 400 may be a stand-alone computing device or may be included in any of client devices 202-206, servers 210-214, or system 300. Observer 400 is shown to include a processing circuit 402 that includes a processor 404 and a memory 410. Processor 404 can be a general-purpose processor, an ASIC, one or more FPGAs, a group of processing components, or other suitable electronic processing structures. In some embodiments, processor 304 is configured to execute program code stored on memory 410 to cause observer 400 to perform one or more operations, as described below in greater detail. It will be appreciated that, in embodiments where observer 400 is part of another computing device (e.g., client devices 202-206, servers 210-214, and/or system 300), the components of observer 400 may be shared with, or the same as, the host device. For example, if observer 400 is implemented via client device 202, then observer 400 may utilize the processing circuit, processor(s), and/or memory of client device 202 to perform the functions described herein.

Memory 410 can include one or more devices (e.g., memory units, memory devices, storage devices, etc.) for storing data and/or computer code for completing and/or facilitating the various processes described in the present disclosure. In some embodiments, memory 410 includes tangible (e.g., non-transitory), computer-readable media that stores code or instructions executable by processor 404. Tangible, computer-readable media refers to any physical media that is capable of providing data that causes observer 400 to operate in a particular fashion. Example tangible, computer-readable media may include, but is not limited to, volatile media, non-volatile media, removable media and non-removable media implemented in any method or technology for storage of information such as computer readable instructions, data structures, program modules or other data. Accordingly, memory 410 can include RAM, ROM, hard drive storage, temporary storage, non-volatile memory, flash memory, optical memory, or any other suitable memory for storing software objects and/or computer instructions. Memory 410 can include database components, object code components, script components, or any other type of information structure for supporting the various activities and information structures described in the present disclosure. Memory 410 can be communicably connected to processor 404, such as via processing circuit 402, and can include computer code for executing (e.g., by processor 404) one or more processes described herein.

While shown as individual components, it will be appreciated that processor 404 and/or memory 410 can be implemented using a variety of different types and quantities of processors and memory. For example, processor 404 may represent a single processing device or multiple processing devices. Similarly, memory 410 may represent a single memory device or multiple memory devices. Additionally, in some embodiments, observer 400 may be implemented within a single computing device (e.g., one server, one housing, etc.). In other embodiments, observer 400 may be distributed across multiple servers or computers (e.g., that can exist in distributed locations). For example, observer 400 may include multiple distributed computing devices (e.g., multiple processors and/or memory devices) in communication with each other that collaborate to perform operations. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. For example, virtualization software may be employed by observer 400 to provide the functionality of a number of servers that is not directly bound to the number of computers in observer 400.

Memory 410 is shown to include a malicious activity detector 412 that identifies malicious activity and, if appropriate, initiates corrective actions. In particular, malicious activity detector 412 obtains handshake parameters when two or more computing devices establish a secure connection and, based on the handshake parameters, determines or predicts whether the connection is malicious. As mentioned above, malicious activity detector 412 may also detect MITM attacks based on handshake parameters. In some embodiments, where observer 400 is hosted on one of client devices 202-206, malicious activity detector 412 may obtain handshake parameters directly from an application on the client device that initiates the connection. For example, malicious activity detector 412 may monitor connection requests from all the applications executing on the client device and, if a connection is detected, may record the "client hello" and "server hello" parameters. In some embodiments, where observer 400 is a stand-alone computing device or is hosted on another device connected to network 230, malicious activity detector 412 may intercept handshake parameters as a client device (e.g., one of client devices 202-206) communicates with a target device (e.g., one of servers 210-214).

When handshake parameters are received, malicious activity detector 412 may either determine whether the connection is malicious based on known clean and malicious applications and/or targets or may predict maliciousness. In some embodiments, malicious activity detector 412 compares handshake parameters to a static list 420, which may be the same as, or functionally equivalent to, static list 322, described above. In some such embodiments, static list 420 may be received from system 300 and/or may be updated with data from system 300. In some embodiments, malicious activity detector 412 executes a machine learning model 414 by providing the handshake parameters as inputs. As described herein, machine learning model 414 is generally the same as, or equivalent to, the trained machine learning model generated and provided by system 300 (e.g., machine learning model 314). For example, system 300 may transmit machine learning model 314 to observer 400 after training such that observer 400 can use the trained model (e.g., referred to as machine learning model 414) to predict maliciousness.

As described above, in some embodiments, machine learning model 414 outputs a classification (e.g., "malicious" or "clean"), which may be binary. In some embodiments, machine learning model 414 outputs a value indicating a likelihood of maliciousness. For example, machine learning model 414 may output a value between 0 and 1, where '0' is "not malicious" or "clean," and '1' is "malicious." In some such embodiments, a connection may only be identified as "malicious" or "clean" if the value provided by machine learning model 414 is above or below a threshold. For example, malicious activity detector 412 may determine whether the output of machine learning model 414 is above 0.6, indicating malicious, or below 0.4, indicating not malicious. In some embodiments, any output that falls between these upper and lower thresholds may be classified as "unknown," in which the handshake parameters for the associated connection request may be stored for further evaluation. Alternatively, only one threshold may be set. For example, any prediction above 0.5 may be labelled as "malicious" while any prediction below 0.5 is "clean."

In some embodiments, machine learning model 414 outputs a confidence score for the prediction. A confidence score generally indicates a likelihood that the prediction is correct. For example, if machine learning model 414 predicts that a connection is malicious with a 95% confidence score, then it is highly likely that the prediction is correct, whereas a confidence score of 40% would indicate that the prediction may not be accurate. Similarly, a confidence score of 85% for a prediction of "clean" would indicate that the connection is very likely to be clean (i.e., non-malicious). In some embodiments, malicious activity detector 412 may determine that a connection is malicious or clean only if the confidence score is above a threshold, such as 50% or 0.5.

In some cases, obtained handshake parameters are not in a suitable form for evaluation by machine learning model 414. For example, as discussed above with respect to machine learning model 314, machine learning model 414 may require only numerical values as inputs, whereas some handshake parameters (e.g., the target domain name) are alphabetic. In some such embodiments, malicious activity detector 412 further includes an NLP model 416 that is the same as, or functionally equivalent to, NLP model 316 described above. In some embodiments, malicious activity detector 412 further includes a classifier/encoder 418 that is the same as, or functionally equivalent to, classifier/encoder 318, described above. Thus, for the sake of brevity, NLP model 416 and classifier/encoder 418 are not fully redescribed herein.

Observer 400 is also shown to include a communications interface 430 that facilitates communications between observer 400 and any external components or devices, including client devices 202-206, servers 210-214, and/or system 300. For example, communications interface 430 can provide means for transmitting data to, or receiving data from, servers 210-214. In some embodiments, communications interface 430 allows observer 400 to intercept data transmitted between two or more devices (e.g., data transmitted from client device 202 to server 210). Accordingly, communications interface 430 can be or can include a wired or wireless communications interface (e.g., jacks, antennas, transmitters, receivers, transceivers, wire terminals, etc.) for conducting data communications, or a combination of wired and wireless communication interfaces. In some embodiments, communications via communications interface 430 are direct (e.g., local wired or wireless communications) or via a network (e.g., a WAN, the Internet, a cellular network, etc.). For example, communications interface 430 may include one or more Ethernet ports for communicably coupling observer 400 to a network (e.g., the Internet). In another example, communications interface 430 can include a WiFi transceiver for communicating via a wireless communications network. In yet another example, communications interface 430 may include cellular or mobile phone communications transceivers.

Malware Detection Model

Figure 5:
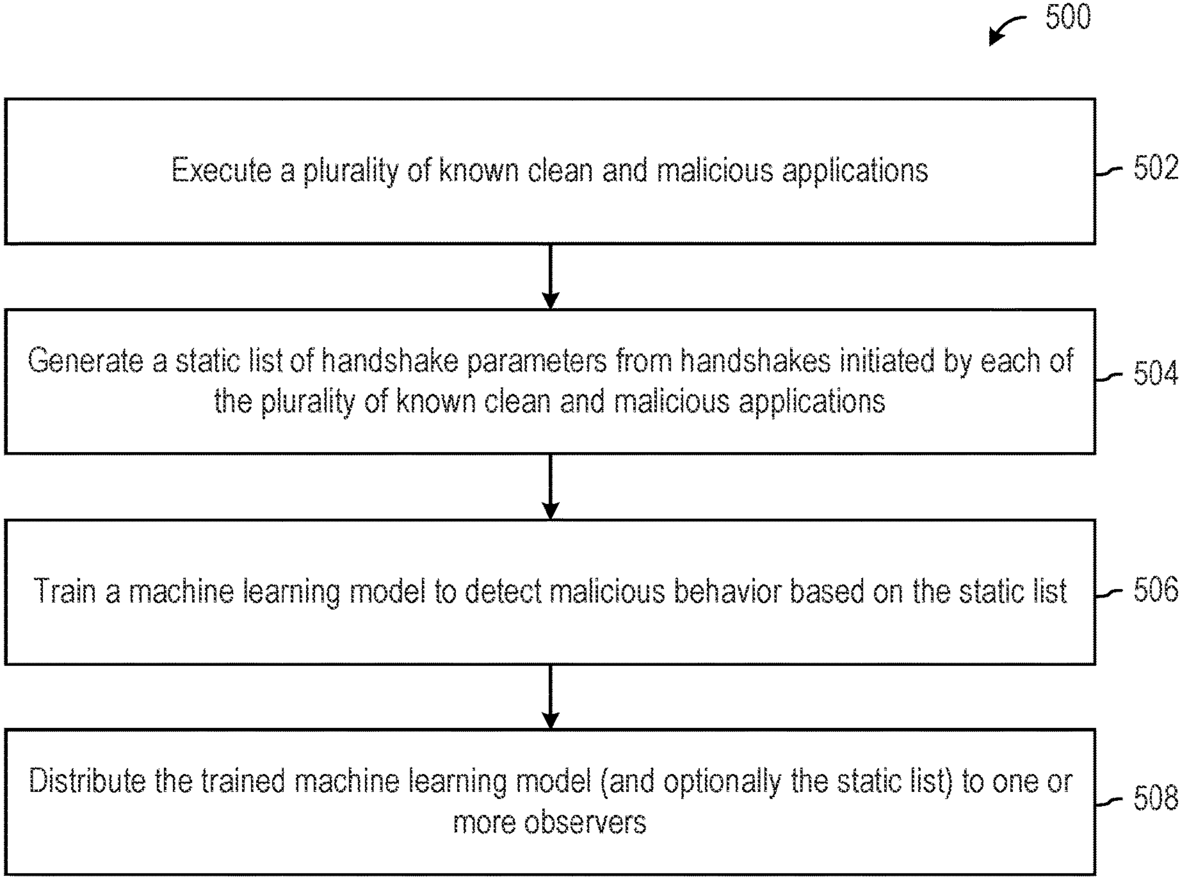
FIG. 5 is a flow diagram of a process for training a malware detection model, according to some embodiments.

Referring now to FIG. 5, a flow diagram of a process 500 for training a malware detection model is shown, according to some embodiments. In some embodiments, process 500 is implemented by system 300, as described above. For example, process 500 can be implemented by system 300 to train machine learning model 314. Although, it will be appreciated that, in various embodiments, process 500 is implemented wholly, or in part, by observer 400 or any other computing device. It will be appreciated that certain steps of process 500 may be optional and, in some embodiments, process 500 may be implemented using less than all of the steps.

At step 502, a plurality of known clean and known malicious applications are executed. As described above, "applications" are generally software applications such as word processing programs, image or video editing software, data management software, web browsers, and the like. In general, the applications executed at step 502 are applications that can initiate connections with external devices or systems (e.g., remote servers). In various implementations, the connections may be established using TLS/SSL, QUIC, SSH, or other protocols. As described herein, a "clean" application is an application that is known and/or confirmed to not contain malware. For example, a clean application is known to not connect to malicious target devices. In contrast, a "malicious" application is known and/or confirmed to contain malware and/or connect to malicious target devices (e.g., malicious servers). In some embodiments, the plurality of known clean and known malicious applications are executed in a sandbox, which is a secure testing environment (e.g., secure environment 320) in system 300. By executing the plurality of known clean and known malicious applications in a secure environment, the handshake parameters associated with the applications and their corresponding target devices can be obtained. For example, when a known clean or malicious application is executed and initiates a connection with a target server, the "client hello" parameters for the application can be recorded. Subsequently, the target server may respond with a "server hello" message and the corresponding parameters may also be recorded.

At step 504, a static list (e.g., static list 322) of handshake parameters is generated. Handshake parameters generally include the client-side connection parameters associated with the application or client device and the target-side connection parameters associated with the target device/server. In a TLS/SSL handshake for an HTTPS connection, for example, client-side connection parameters are defined in a "client hello" or client channel setup message and target-side connection parameters are defined in a "server hello" or server channel setup message. Accordingly, the static list may be a database of handshake parameters for known clean and malicious applications.

As described above, the "client hello" or client channel setup message may include parameters such as a version of the protocol, a list of cypher suites supported by the client device/application, a list of elliptic curves supported by the client device/application, a server identification name (SNI) or hostname (i.e., the hostname that the application is attempting to connect to), the data compression methods supported by the client device/application, a Diffie-Hellman (DH) parameter (if present), and a random byte string (optional) to be used in subsequent computations. As also described above, the "server hello" or server channel setup message may include parameters such as a list of cypher suites supported by the target server (e.g., one of servers 210-214), a selected cypher suite, a domain name of the target, an issuer of the server's certificate, an algorithm, an exponent, a list of client certificate types, a second DH parameter (if present), the digital certificate for the target server, and a request for the digital certificate of the client device/application (optional).

At step 506, a machine learning model (e.g., machine learning model 314) is trained to detect malicious behavior using the static list. As described above with respect to FIG. 3, the machine learning model is generally configured to predict a maliciousness of a connection based on the connections' associated handshake parameters (e.g., based on the "client hello" and "server hello" messages). In some embodiments, the machine learning model outputs a classification of "malicious" or "clean" for the connection. Accordingly, the machine learning model can be any suitable classification model, such as a neural network, a deep neural network, a Support Vector Machine (SVM), a nearest neighbor model, a Naïve-Bayes model, a decision tree, a linear regression model, or the like. In some embodiments, the machine learning model outputs a "maliciousness score," which is a value indicating a likelihood of maliciousness.

Training the machine learning model is generally accomplished using any suitable supervised training techniques. At the simplest, the machine learning model is trained by iteratively executing (i.e., running) the machine learning model using the handshake parameters stored in the static list as inputs, and comparing the output of the machine learning model to a known value for the corresponding handshake parameters. For example, a first set of handshake parameters fed into the model may return a prediction of "malicious" for the associated connection, and this "malicious" prediction can be compared to the known value (e.g., malicious or clean) of the associated connection/application. Then, the weights of the machine learning model can be adjusted to minimize the error or maximize the accuracy of the machine learning model.

At step 508, the trained machine learning model is distributed to one or more observers (e.g., observers 220-224). An observer, as described above with respect to FIGS. 2 and 4, is a computing device that monitors connections between two or more computing devices. Observers can be standalone computing devices positioned/connected anywhere that network traffic can be monitored, or observers can be programs executing on client devices (e.g., client devices 202-206) or servers (e.g., servers 210-214). Accordingly, in some embodiments, distributing the trained machine learning model to the observers can include transmitting the trained machine learning model to one or more client devices or servers. As discussed in further detail below, the observers may then be executed (e.g., regularly or continuously) to monitor connections initiated by applications on a corresponding client device to detect malicious behavior.

Figure 6:
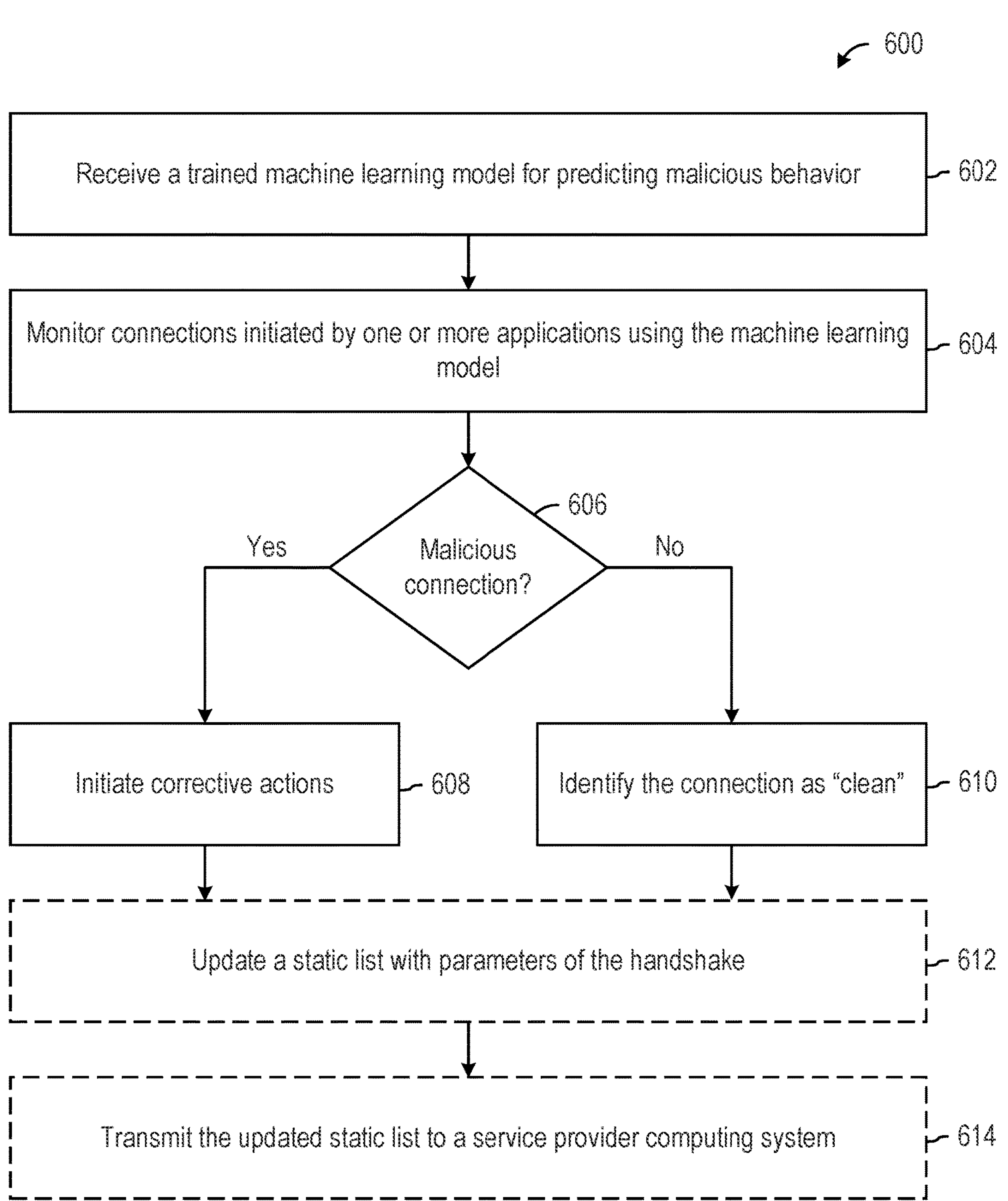
FIG. 6 is a flow diagram of a process for detecting malicious connections between two or more computing devices, according to some embodiments.

Referring now to FIG. 6, a flow diagram of a process 600 for detecting malicious connections between two or more computing devices is shown, according to some embodiments. In some embodiments, process 600 may also be used to detect MITM attacks and/or remote devices that intercept and/or modify data as it's being communicated between two or more computing devices. In some embodiments, process 600 is implemented by observer 400, as described above; although it will be appreciated that, in various embodiments, process 600 is implemented wholly, or in part, by system 300 or any other computing device. For example, as described above, observer 400 may be a component of client devices 202-206; therefore, certain steps or portions of process 600 may be implemented by the corresponding client device. It will be appreciated that certain steps of process 600 may be optional and, in some embodiments, process 600 may be implemented using less than all of the steps.

At step 602, a trained machine learning model (e.g., machine learning model 414) is received. In some embodiments, the trained machine learning model is received from a CSSP. In some such embodiments, the trained machine learning model may be received from system 300, which is generally operated by a CSSP. As described above with respect to FIGS. 3 and 4, the trained machine learning model is generally configured to predict a maliciousness of a connection based on the connections' associated handshake parameters (e.g., based on the "client hello" and "server hello" messages). In some embodiments, the machine learning model outputs a classification of "malicious" or "clean" for the connection. Accordingly, the machine learning model can be any suitable classification model, such as a neural network, a deep neural network, a Support Vector Machine (SVM), a nearest neighbor model, a Naïve-Bayes model, a decision tree, a linear regression model, or the like. In some embodiments, the machine learning model outputs a "maliciousness score," which is a value indicating a likelihood of maliciousness.

In some embodiments, the trained machine learning model outputs a classification (e.g., "malicious" or "clean"), which may be binary. In some embodiments, the trained machine learning model outputs a value indicating a likelihood of maliciousness. For example, the trained machine learning model may output a value between 0 and 1, where '0' is "not malicious" or "clean," and '1' is "malicious." In some such embodiments, a connection may only be identified as "malicious" or "clean" if the value provided by the trained machine learning model is above or below a threshold. For example, an output above 0.6 may indicate a malicious connection, whereas 0.4 or below may indicate that the connection is not malicious. In some embodiments, any output that falls between these upper and lower thresholds may be classified as "unknown," in which the handshake parameters for the associated connection request may be stored for further evaluation. Alternatively, only one threshold may be set. For example, any prediction above 0.5 may be labelled as "malicious" while any prediction below 0.5 is "clean."

In some embodiments, the trained machine learning model outputs a confidence score for the prediction. A confidence score generally indicates a likelihood that the prediction is correct. For example, if the trained machine learning model predicts that a connection is malicious with a 95% confidence score, then it is highly likely that the prediction is correct, whereas a confidence score of 40% would indicate that the prediction may not be accurate. Similarly, a confidence score of 85% for a prediction of "clean" would indicate that the connection is very likely to be clean (i.e., non-malicious). In some embodiments, a connection is determined to be malicious or clean only if the confidence score is above a threshold, such as 50% or 0.5.

At step 604, connections between a client device (e.g., one of client devices 202-206) and one or more target devices (e.g., server 210-214) are monitored. In particular, the observer (e.g., observer 400) may record or otherwise detect connection parameters responsive to the client device, or, more specifically, an application executing on the client device, initiating a connection with a target device (e.g., a target server). For example, if the observer is part of the client device, it may monitor data transmitted externally to the client device. If the observer is positioned elsewhere within a network, the observer may intercept and monitor data transmitted between two or more devices. As described above, a "connection" refers to ay connection between at least two computing devices that is secured using a secure communication protocol, such as TLS/SSL, QUIC, or SSH protocols. Accordingly, monitoring connections generally includes recording handshake parameters transmitted by the client device and received from the target device. Handshake parameters may include client-side connection parameters and target-side connection parameters. As described above, client-side connection parameters are defined in a "client hello" or client channel setup message and target-side connection parameters are defined in a "server hello" or server channel setup message. For the sake of brevity, the specific handshake parameters monitored at step 606 are not reproduced herein but are discussed above.

In some embodiments, as handshake parameters are obtained (e.g., by recording responsive to the client device initiating a connection), the handshake parameters are provided as inputs to the trained machine learning model. In this manner, the trained machine learning model may predict a maliciousness of each connection initiated by the client device (e.g., more specifically, by an application on the client device). As described above, for example, the trained machine learning model may output a predicted maliciousness (e.g., a value from '0' to '1', where '0' is not malicious/clean and '1' is malicious) or a maliciousness score. In some embodiments, the trained machine learning model outputs a confidence score for the prediction which is further considered (e.g., by observer 400) in determining whether the connection is safe. In some embodiments, either in addition to or prior to generating a prediction using the trained machine learning model, the handshake parameters may be used to search a database of known malicious applications and/or connection parameters (e.g., static list 420). In this manner, malicious connections may be quickly identified if a match exists and, if a match is not identified, the trained machine learning model can generate a prediction.

If it is determined that the connection is malicious (step 606) then, at step 608, corrective actions may be automatically initiated. In some embodiments, the corrective action is initiated by the observer itself. In other embodiments, the observer may transmit a command to another device or component that causes the other device or component to initiate an action. In some embodiments, the corrective action includes blocking or terminating the connection. For example, the observer may prevent an associated client device from transmitting data. In some embodiments, the corrective action includes suspending, deleting, or quarantining a software application (e.g., executing on the client device) that initiated the connection. For example, the observer may cause the client device to suspend and quarantine the application. In some embodiments, the corrective action includes generating an alert indicating to a user (e.g., of the client device) that the connection is predicted to be malicious. The alert may be displayed via a user interface of the client device, for example, and may provide the user with selectable options for addressing the potentially malicious activity. For example, the alert may prompt the user to suspend the application, quarantine the application, terminate or block the connection, report the malicious activity, etc., and may even provide the user with an option to allow the connection.

If it is determined that the connection is not malicious (step 606) then, at step 610, the connection is identified as "clean." In some such embodiments, a "clean" or safe connection may simply be allowed to continue. For example, the application running on the client device may be allowed to exchange data with the target device. At step 612, a static list (e.g., static list 420) containing handshake parameters for various known clean and malicious applications and target devices may optionally be updated to include the handshake parameters for the detected connection (e.g., at steps 606-610). For example, if the connection is predicted to be malicious, then the associated connection parameters may be saved to the static list along with the predicted maliciousness. Similarly, if the connection is predicted to be clean, then the associated connection parameters may be saved to the static list along with an indication of "clean." However, it will be appreciated that storing connection parameters for all "clean" connections may be computationally burdensome. Accordingly, in some embodiments, not all "clean" connection parameters are added to the static list. Further, it will be appreciated that connection parameters may first be reviewed by an expert user prior to updating the static list. For example, the expert user may review connection parameters to determine whether the prediction (e.g., at step 606) is truly accurate before updating the static list, thus reducing the possibility of false positives or false negatives in said predictions. At step 614, the updated static list may optionally be transmitted to a service provider computing system, such as system 300.

Figure 7:
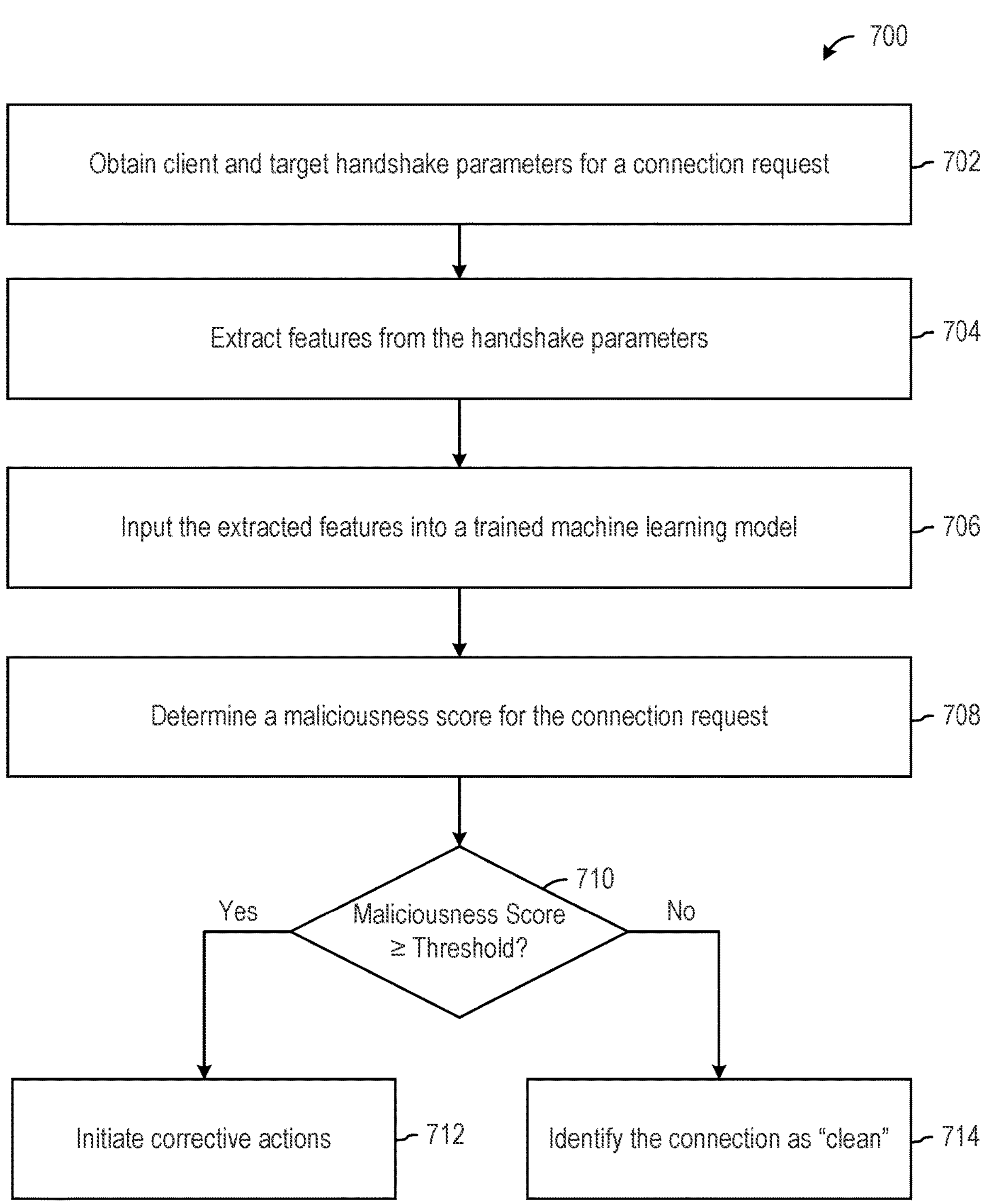
FIG. 7 is a flow diagram of a process for determining the maliciousness of a connection between two or more computing devices, according to some embodiments.

Referring now to FIG. 7, a flow diagram of a process 700 for determining the maliciousness of a connection between two or more computing devices is shown, according to some embodiments. In some embodiments, process 700 is implemented by observer 400, as described above; although it will be appreciated that, in various embodiments, process 700 is implemented wholly, or in part, by system 300 or any other computing device. For example, as described above, observer 400 may be a component of client devices 202-206; therefore, certain steps or portions of process 700 may be implemented by the corresponding client device. It will be appreciated that certain steps of process 700 may be optional and, in some embodiments, process 700 may be implemented using less than all of the steps.

At step 702, client device handshake parameters and target device (e.g., server) handshake parameters are obtained responsive to the client device initiating a connection with the target device. In some embodiments, the client device handshake parameters (e.g., from the "client hello" message) are recorded (e.g., by observer 400) responsive to an application on the client device initiating a connection (e.g., an HTTPS connection). When the target device responds (e.g., with a "server hello" message), the target device's handshake parameters may be recorded. In some embodiments, the handshake parameters are recorded by an observer on the client device itself. In other embodiments, the observer may intercept and record the handshake parameters. In still other embodiments, the target device may include an observer that collects the handshake parameters.

At step 704, features are extracted from the handshake parameters. In some embodiments, extracting features from the handshake parameters includes generating a feature set to be used as an input to a machine learning model that predicts maliciousness later in process 700. Accordingly, the features extracted from the handshake parameters may vary based on the type of machine learning model used. In any case, extracting the features may include identifying and filtering all of the obtained handshake parameters to define a subset of handshake parameters required for executing the machine learning model. For example, while "handshake parameters," as described herein, generally include any connection parameters relating to TLS/SSL, QUIC, SSH, or other connection protocols, the machine learning model may only need a subset of parameters to generate a prediction. Accordingly, some parameters may be filtered out to generate the feature set.

In some embodiments, extracting features includes processing alphabetic words or phrases. In some such embodiments, alphabetic or non-numeric parameters (e.g., a hostname) may be provided as an input to an NLP model (e.g., NLP model 316) that predicts a maliciousness of the associated parameter. For example, the NLP model may predict a maliciousness of a connection by evaluating the target domain name (e.g., a domain name with spelling errors, out-of-place characters, etc., may be malicious). In this example, if the NLP model predicts that an alphabetical parameter is malicious, it may output a binary value (e.g., '0' or '1'), a confidence score, and/or a maliciousness score (e.g., from 0 to 1).

In some embodiments, extracting features includes converting non-numerical or alphanumeric parameters into numerical values. In some such embodiments, non-numerical or alphanumeric parameters may be mapped to numerical values using, for example, a lookup table or dictionary. For example, TLS/SSL handshakes may use a limited number of different cypher suites; thus, the cypher suite(s) supported by the client device and the select cypher suite provided by the target device can be encoded as numerical values. In some embodiments, extracting features includes normalizing numerical parameters. For example, some parameters may have values that would disproportionately affect the output of the machine learning model; thus, these parameters may be normalized to more closely match the other parameters provided as inputs to the model.

At step 706, the extracted features are provided as inputs to a trained machine learning model that predicts maliciousness, such as the machine learning model described above. Subsequently, at step 708, a maliciousness score is determined for the connection based on the output from the machine learning model. As described above, the trained machine learning model can output a classification (e.g., "malicious" or "clean") for the connection and/or may output a maliciousness "score," which is a value indicating a likelihood of maliciousness. For example, the trained machine learning model may output a value between 0 and 1, where '0' is "not malicious" or "clean," and '1' is "malicious." In some such embodiments, a connection may only be identified as "malicious" or "clean" if the value provided by the trained machine learning model is above or below a threshold. For example, an output above 0.6 may indicate a malicious connection, whereas 0.4 or below may indicate that the connection is not malicious. In some embodiments, any output that falls between these upper and lower thresholds may be classified as "unknown," in which the handshake parameters for the associated connection request may be stored for further evaluation. Alternatively, only one threshold may be set. For example, any prediction above 0.5 may be labelled as "malicious" while any prediction below 0.5 is "clean."

In some embodiments, the trained machine learning model outputs a confidence score for the prediction. A confidence score generally indicates a likelihood that the prediction is correct. For example, if the trained machine learning model predicts that a connection is malicious with a 95% confidence score, then it is highly likely that the prediction is correct, whereas a confidence score of 40% would indicate that the prediction may not be accurate. Similarly, a confidence score of 85% for a prediction of "clean" would indicate that the connection is very likely to be clean (i.e., non-malicious). In some embodiments, a connection is determined to be malicious or clean only if the confidence score is above a threshold, such as 50% or 0.5.

If the maliciousness score or confidence score meets or exceeds a threshold (step 710) then, at step 712, corrective actions may be automatically initiated. In some embodiments, the corrective action is initiated by the observer itself. In other embodiments, the observer may transmit a command to another device or component that causes the other device or component to initiate an action. In some embodiments, the corrective action includes blocking or terminating the connection. For example, the observer may prevent an associated client device from transmitting data. In some embodiments, the corrective action includes suspending, deleting, or quarantining a software application (e.g., executing on the client device) that initiated the connection. For example, the observer may cause the client device to suspend and quarantine the application. In some embodiments, the corrective action includes generating an alert indicating to a user (e.g., of the client device) that the connection is predicted to be malicious. The alert may be displayed via a user interface of the client device, for example, and may provide the user with selectable options for addressing the potentially malicious activity. For example, the alert may prompt the user to suspend the application, quarantine the application, terminate or block the connection, report the malicious activity, etc., and may even provide the user with an option to allow the connection. If the maliciousness score or confidence score does not meet or exceed the threshold (step 710) then, at step 714, the connection is identified as "clean." In some such embodiments, a "clean" or safe connection may simply be allowed to continue. For example, the application running on the client device may be allowed to exchange data with the target device.

Configuration of Certain Implementations

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied, and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions, and arrangement of the exemplary embodiments without departing from the scope of the present disclosure.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products including machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures, and which can be accessed by a general purpose or special purpose computer or other machine with a processor.

When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general-purpose computer, special purpose computer, or special purpose processing machines to perform a certain function or group of functions.

Although the figures show a specific order of method steps, the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. It is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes. "Optional" or "optionally" means that the subsequently described event or circumstance may or may not occur, and that the description includes instances where said event or circumstance occurs and instances where it does not.

What is claimed is:

1. A method for identifying malicious connections between computing devices, the method comprising:

generating a dataset of first handshake parameters for connections to one or more external devices initiated by a first set of software applications, wherein the first set of software applications include one or more known malicious software applications and one or more known non-malicious software applications, wherein for each connection of the connections, a set of handshake parameters is collected, the set of handshake parameters including:

a first subset of handshake parameters transmitted from the first set of software applications to the one or more external devices in a first setup message; and a second subset of handshake parameters transmitted from one of the one or more external devices to the first set of software applications in a second setup message;

wherein generating the dataset comprises evaluating non-numerical data from the first subset of handshake parameters and the second subset of handshake parameters;

training a machine learning model to predict whether subsequent connections are malicious using the dataset;

obtaining second handshake parameters for a connection between a first computing device and a target device responsive to at least one software application of a second set of software applications executing on the first computing device initiating the connection to the target device; generating a feature set by extracting features from the second handshake parameters for the connection between the first computing device and the target device, wherein the second handshake parameters include:

a first set of parameters transmitted from the first computing device to the target device in a client channel setup message; and a second set of parameters transmitted from the target device to the first computing device in a server channel setup message;

wherein the extracting comprises evaluating non-numerical data from the first set of parameters and the second set of parameters;

predicting a maliciousness of the connection between the first computing device and the target device using the trained machine learning model, wherein the extracted features are provided as inputs to the trained machine learning model; and automatically initiating a corrective action if the connection between the first computing device and the target device is predicted to be malicious.

2. The method of claim 1, wherein the trained machine learning model outputs a maliciousness score for the connection between the first computing device and the target device, and where the connection between the first computing device and the target device is predicted to be malicious if the maliciousness score meets or exceeds a threshold value.

3. The method of claim 1, wherein the corrective action comprises at least one of:

blocking or terminating the connection between the first computing device and the target device;

suspending, deleting, or quarantining the at least one software application that initiated the connection; or presenting an alert indicating to a user of the client device that the connection is predicted to be malicious.

4. The method of claim 1, wherein the first handshake parameters and the second handshake parameters comprise connection parameters associated with Secure Sockets Layer (SSL) protocol, Transport Layer Security (TLS) protocol, QUIC protocol, or Secure Shell (SSH) protocol.

5. The method of claim 1, wherein the evaluating non-numerical data comprises at least one of:

encoding non-numerical parameters as numerical values; or generating a probability of maliciousness for any non-numerical parameters by evaluating the non-numerical parameters using a natural language processing (NLP) model.

6. The method of claim 1, wherein the machine learning model is one of a neural network, a deep neural network, a Support Vector Machine (SVM), a nearest neighbor model, a Naïve-Bayes model, a decision tree, or a linear regression model.

7. The method of claim 1, further comprising updating a list of handshake parameters associated with known malicious applications based on the maliciousness of the connection between the first computing device and the target device, wherein updating the list of handshake parameters includes adding a feature of the extracted features to the list.

8. The method of claim 7, wherein updating the list of handshake parameters includes storing the maliciousness of the connection between the first computing device and the target device with the feature.

9. The method of claim 8, further comprising transmitting the list to the first computing device.

10. A malware detection system comprising:

one or more processors; and memory having instructions stored thereon that, when executed by the one or more processors, cause the system to:

generate a dataset of first handshake parameters for connections to one or more external devices initiated by a first set of software applications, wherein the first set of software applications include one or more known malicious software applications and one or more known non-malicious software applications, wherein for each connection of the connections, a set of handshake parameters is collected, the set of handshake parameters including:

a first subset of handshake parameters transmitted from the first set of software applications to the one or more external devices in a first setup message; and a second subset of handshake parameters transmitted from one of the one or more external devices to the first set of software applications in a second setup message;

wherein generating the dataset comprises evaluating non-numerical data from the first subset of handshake parameters and the second subset of handshake parameters;

train a machine learning model to predict whether subsequent connections are malicious using the dataset;

obtain second handshake parameters for a connection between a first computing device and a target device responsive to at least one software application of a second set of software applications executing on the first computing device initiating the connection to the target device;

generate a feature set by extracting features from the second handshake parameters for the connection between the first computing device and the target device, wherein the second handshake parameters include:

a first set of parameters transmitted from the first computing device to the target device in a client channel setup message; and a second set of parameters transmitted from the target device to the first computing device in a server channel setup message;

wherein the extracting comprises evaluating non-numerical data from the first set of parameters and the second set of parameters;

predict a maliciousness of the connection between the first computing device and the target device using the trained machine learning model, wherein the extracted features are provided as inputs to the trained machine learning model; and automatically initiate a corrective action if the connection between the first computing device and the target device is predicted to be malicious.

11. The system of claim 10, wherein the trained machine learning model outputs a maliciousness score for the connection between the first computing device and the target device, and where the connection between the first computing device and the target device is predicted to be malicious if the maliciousness score meets or exceeds a threshold value.

12. The system of claim 10, wherein the corrective action comprises at least one of:

blocking or terminating the connection between the first computing device and the target device;

suspending, deleting, or quarantining the at least one software application that initiated the connection; or presenting an alert indicating to a user of the client device that the connection is predicted to be malicious.

13. The system of claim 10, wherein the first handshake parameters and the second handshake parameters comprise connection parameters associated with Secure Sockets Layer (SSL) protocol, Transport Layer Security (TLS) protocol, QUIC protocol, or Secure Shell (SSH) protocol.

14. The system of claim 10, wherein the evaluating non-numerical data comprises at least one of:

encoding non-numerical parameters as numerical values; or generating a probability of maliciousness for any non-numerical parameters by evaluating the non-numerical parameters using a natural language processing (NLP) model.

15. The system of claim 10, wherein the machine learning model is one of a neural network, a deep neural network, a Support Vector Machine (SVM), a nearest neighbor model, a Naïve-Bayes model, a decision tree, or a linear regression model.

16. A non-transitory computer readable medium having instructions stored thereon that, when executed by one or more processors, cause the one or more processors to perform operations comprising:

generating a dataset of first handshake parameters for connections to one or more external devices initiated by a first set of software applications, wherein the first set of software applications include one or more known malicious software applications and one or more known non-malicious software applications, wherein for each connection of the connections, a set of handshake parameters is collected, the set of handshake parameters including:

a first subset of handshake parameters transmitted from the first set of software applications to the one or more external devices in a first setup message; and a second subset of handshake parameters transmitted from one of the one or more external devices to the first set of software applications in a second setup message;

wherein generating the dataset comprises evaluating non-numerical data from the first subset of handshake parameters and the second subset of handshake parameters;

training a machine learning model to predict whether subsequent connections are malicious using the dataset;

obtaining second handshake parameters for a connection between a first computing device and a target device responsive to at least one software application of a second set of software applications executing on the first computing device initiating the connection to the target device;

generating a feature set by extracting features from the second handshake parameters for the connection between the first computing device and the target device, wherein the second handshake parameters include:

a first set of parameters transmitted from the first computing device to the target device in a client channel setup message; and a second set of parameters transmitted from the target device to the first computing device in a server channel setup message;

wherein the extracting comprises evaluating non-numerical data from the first set of parameters and the second set of parameters;

predicting a maliciousness of the connection between the first computing device and the target device using the trained machine learning model, wherein the extracted features are provided as inputs to the trained machine learning model; and automatically initiating a corrective action if the connection between the first computing device and the target device is predicted to be malicious.

17. The non-transitory computer readable medium of claim 16, wherein the trained machine learning model outputs a maliciousness score for the connection between the first computing device and the target device, and where the connection between the first computing device and the target device is predicted to be malicious if the maliciousness score meets or exceeds a threshold value.

18. The non-transitory computer readable medium of claim 16, wherein the corrective action comprises at least one of:

blocking or terminating the connection between the first computing device and the target device;

suspending, deleting, or quarantining the at least one software application that initiated the connection; or presenting an alert indicating to a user of the client device that the connection is predicted to be malicious.

19. The non-transitory computer readable medium of claim 16, wherein the first handshake parameters and the second handshake parameters comprise connection parameters associated with Secure Sockets Layer (SSL) protocol, Transport Layer Security (TLS) protocol, QUIC protocol, or Secure Shell (SSH) protocol.

20. The non-transitory computer readable medium of claim 16, wherein the machine learning model is one of a neural network, a deep neural network, a Support Vector Machine (SVM), a nearest neighbor model, a Naïve-Bayes model, a decision tree, or a linear regression model.

* * * * *